Aug. 26, 1947.                    A. G. HANDY                    2,426,207
         AERIAL VIEWER WITH OBSTACLE BYPASSING OPTICAL
            SYSTEM COMPRISING LENS AND MIRROR MEANS
                    Filed Feb. 2, 1945              2 Sheets-Sheet 1
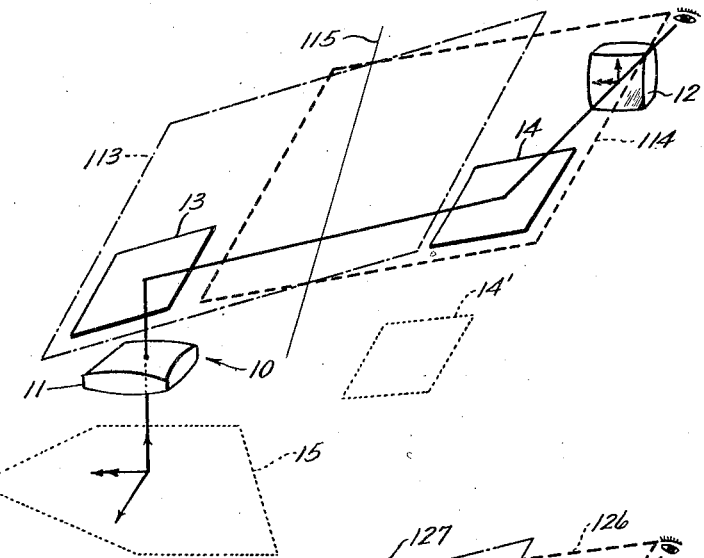
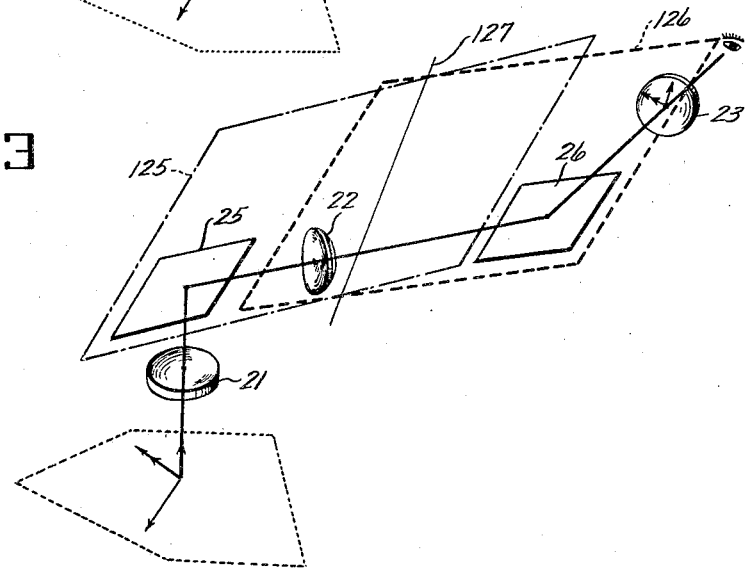
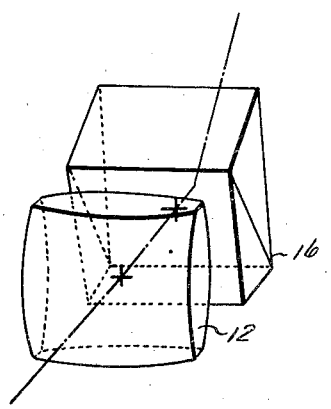
INVENTOR.
ALDEN G. HANDY
BY
ATTORNEYS Aug. 26, 1947.  A. G. HANDY  2,426,207
AERIAL VIEWER WITH OBSTACLE BYPASSING OPTICAL
SYSTEM COMPRISING LENS AND MIRROR MEANS
Filed Feb. 2, 1945   2 Sheets-Sheet 2

INVENTOR.
ALDEN G. HANDY
BY
ATTORNEYS

Patented Aug. 26, 1947

2,426,207

UNITED STATES PATENT OFFICE 2,426,207

AERIAL VIEWER WITH OBSTACLE BY-PASSING OPTICAL SYSTEM COMPRISING LENS AND MIRROR MEANS

Alden G. Handy, Boston, Mass.

Application February 2, 1945, Serial No. 575,829

1 Claim. (Cl. 88—72)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an aerial viewer, and more particularly one adapted for enabling the pilot of an airplane in flight to observe in a substantially vertical plane in front of him, an object on the ground beneath his airplane.

When a pilot flies his airplane, especially while on a photographic mission and where such airplane has an obstacle positioned centrally forward of the pilot, such as the front landing wheel well, it is desirable to utilize a viewer which is arranged so that it will divert the rays around such an obstacle and can at the same time have its eyepiece end placed in front of the pilot and in his line of sight, in such a manner that it is in a position convenient for him to observe an object on the ground below, which it may be desired to photograph, while he is also watching his instrument board in the usual way.

It is an object of this invention to provide the pilot in his airplane, especially where such airplane has a central landing wheel well or similar obstacle or obstruction in front of him and where the pilot is on a photographic mission, with a viewer which may have its objective end placed alongside of said obstacle and which is arranged so that its eyepiece end can be positioned centrally of the instrument panel, so that the pilot can observe directly in front of him and in a substantially vertical plane a resultant image which is real, erect and unreversed of an object in a substantially horizontal plane on the ground below.

Another object of this invention is to provide an aerial viewer optical system which comprises a reflector-system and a lens-system combined therewith, and wherein the lens-system refracts and transmits the vertical rays from an object on the ground therebelow to be reflected by the reflector-system around an obstacle to a viewing member which is positioned in the focal plane of said lens-system so as to present in a substantially vertical plane an image which is real, erect and unreversed of the object on the ground below.

Other objects and advantages of this invention will become apparent from the following description taken in connection with the accompanying drawings wherein this invention is disclosed in a few of its various suitable forms of construction and arrangement, it being evident that other forms and arrangements may be resorted to in carrying out the objects and purposes of this invention.

In the drawings:

Fig. 1 is a diagrammatic view illustrating the arrangement of the lenses and mirrors utilized in one form of my invention.

Fig. 2 is a diagrammatic view showing the eyepiece or viewing member of this invention in the form of a positive lens and provided with a prism for inclining the emergent beam at an angle convenient for the observer.

Fig. 3 is a diagrammatic view illustrating this invention in a modified form.

Figure 4:
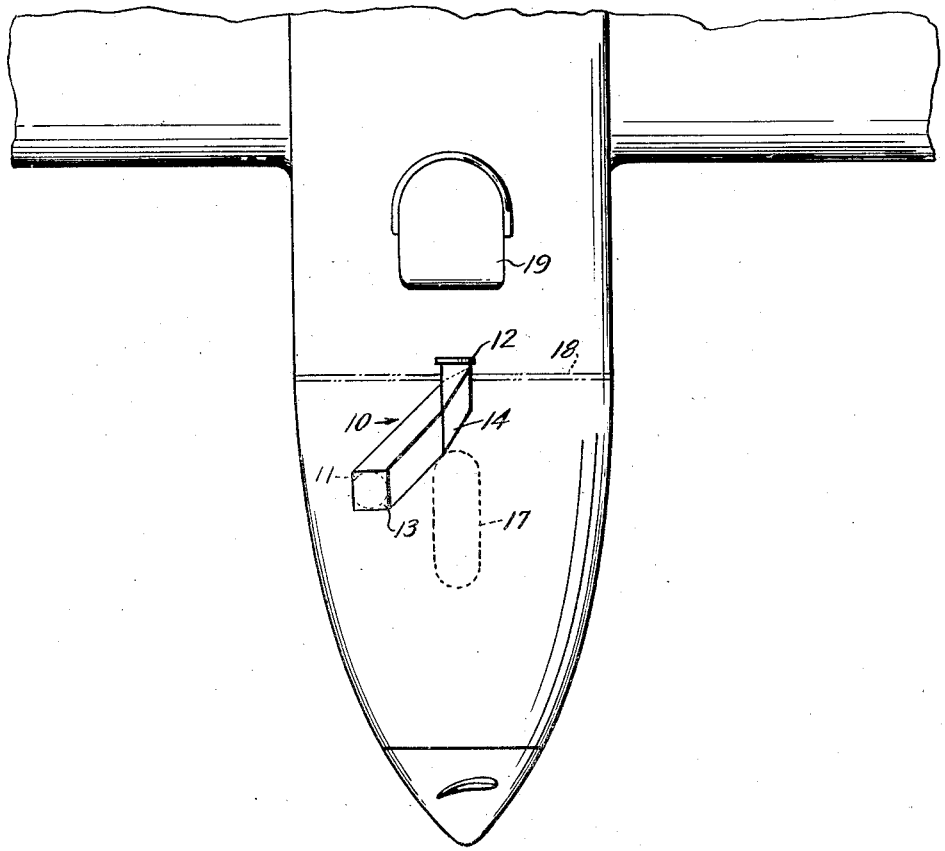
Fig. 4 is a plan view showing this invention applied to an airplane, so as to circumvent an obstacle in the form of a central landing wheel well located in front of the pilot.

The viewer embodying this invention involves mainly a novel optical system, and it is more particularly adapted for use in an airplane which is on a photographic mission and which contains a central landing wheel well or similar obstacle forward of the pilot. This improved viewer embodies essentially a lens-system placed at the objective end of the viewer and a viewing member placed at the eyepiece end thereof, and in conjunction therewith this viewer comprises a plurality of reflecting surfaces which are preferably in the shape of plane mirrors set in planes which are oblique to each other and which are also oblique to the central ray passing from the object on the ground through the lens-system, and said mirrors functioning for further inverting and reversing the image of the rays which were refracted by the lens-system with an inverting and reversing effect, and for deflecting the initially vertical rays from the ground object around said obstacle or obstruction into a substantially horizontal path to the vertically disposed plane of the viewing member.

In the form of viewer 10 illustrated in Fig. 1 of the drawings the lens-system is in the shape of a positive lens or real-image forming lens 11 mounted at the objective end of the viewer, and the viewing member is shown in the shape of a lens 12 mounted at the eyepiece end thereof. Said lens 11 is of such focal length that the image of a distant object on the ground is formed in the plane of said lens 12 as a real, inverted and reversed image; and lens 12 is preferably an enlarged ocular of long focal length to enable an observer rearward of this lens to observe more readily the image formed in the plane thereof, as an aerial image, while a ground glass or similar screen may be used in place of lens 12.

In this form of my invention the reflecting surfaces comprise a pair of plane mirrors 13 and 14 which are interposed between said lenses 11 and 12 and are set at an angle oblique to each other and to the path of the central ray passing from a ground object through said lens 11, so that said central ray engages substantially the centers of the mirrors. These mirrors 13 and 14 are so oriented and mounted in the viewer that the image of an object on the ground at a considerable distance below the airplane and in a substantially horizontal plane 15 will, by the action of these mirrors together, appear as an inverted and reversed image in a substantially vertical plane positioned in front of the pilot. Consequently, by the inversion and reversal of the image by means of lens-system 11 and the further inversion and reversal of the image by said mirrors 13 and 14, there will be formed on the viewing member 12, in the focal plane of the lens-system 11, a real, erect and unreversed image of an object on the ground below, as illustrated by the respective arrows shown on the ground plane 15 and the viewing member 12.

An achromatic prism 16 may also be used, being introduced immediately beyond the viewing member 12, as indicated in Fig. 2, and it serves to incline the beam emerging from member 12 at an angle convenient for the observer, as for example the pilot in the airplane. This inclination of the beam may also be accomplished without the use of such prism, by a slight angular displacement of both mirrors, which entails an increase in the size of the mirrors, however.

With this arrangement and construction of my viewer 10, as indicated in Fig. 4, it can be installed in an airplane which has a central obstacle and so that my viewfinder will have its objective end with lens 11 positioned alongside of the central obstacle, such as a landing wheel well 17 or the like, and so that the viewing member 12 at the eyepiece end of the viewer can be positioned centrally of the instrument panel 18 in front of the pilot on his seat 19, rearward of said well, so that with a minimum of shift of his line of sight, during his flight on a photographic mission, he can view directly in front of him in a substantially vertical plane a real, erect and unreversed image of an object on the ground below, which he may desire to photograph.

Referring to Fig. 1 of the drawings it may be noted that these mirrors 13 and 14 are positioned in my viewer in planes 113 and 114, respectively, which are oblique to each other and to said central ray emanating from the ground through the lens-system 11; and furthermore, the mirrors are so oriented that the planes in which they lie, when extended to intersect will have a line of intersection 115 which is obliquely inclined to said axial or central ray passing through the lens-system. It may further be noted that the mirror 14 is disposed, not only oblique to mirror 13, but also is disposed in linearly spaced relation thereto relative to said intersecting line 115; in other words, mirror 14 is situated forwardly from mirror 13, relative to line 115, in the direction of travel of the central ray through the viewer, from the position shown in Fig. 1 in dotted lines at 14', which relative to line 115 is directly opposite mirror 13, to the position of said mirror 14 occupied in this viewer as shown in full lines in Fig. 1.

In the modified form of my viewer shown in Fig. 3 of the drawings, the lens-system of that construction of viewer includes a negative or virtual-image forming lens 21 placed at the objective end of the viewer to direct the rays from an object on the ground upwardly therethrough, and a positive or real-image forming lens 22 placed at an intermediate position between said negative lens 21 and the viewing member 23 which is mounted in the focal plane of said lenses 21 and 22 combined, at the eyepiece end of the viewer.

The viewing member 23 may be a positive lens of long focal length or it may be a ground glass, similar to the viewing member 12 in the preceding form. The negative lens 21 provides for a wider angle of view than lens 11 of the preceding form, and it will convey a maximum quantity of light incident upon it from the margin of the desired object field below onto the positive lens 22; but at the expense of a greater diminution in the marginal image intensity and somewhat less easily corrected distortion, field curvature and chromatism.

The reflecting surfaces, in this form of my invention are preferably also a pair of plane mirrors 25 and 26, the mirror 25 being oriented to have its center interposed in the path of the central ray emerging from said lens 21, and is placed oblique thereto, so as to reflect the rays from lens 21 to lens 22 which has its optical center coincide with the axial or central ray of this viewer. The mirror 26 is placed beyond lens 22 and is centered on the central ray therefrom to deflect the same to the viewing member 23. These mirrors 25 and 26 are oriented and mounted so that an image of an object on a horizontal plane, as on the ground below the airplane, will be reversed and inverted on a vertical plane, as the plane of the viewing member 23. The lenses 21 and 22 are of such focal length that together they will form a real image at the focal plane, that is on member 23.

Like in the preceding form, these mirrors 25 and 26 by themselves will invert and reverse the image from a ground object to the focal plane, the plane of lens 23, while the lens-system including the negative lens 21 and the positive lens 22 is also effective for inverting and reversing such image, so that the resultant image formed in the focal plane at 23 will therefore be an image which is real, erect and unreversed of the object on the ground below the airplane, the same as in the preceding form of my invention. The mirrors 25 and 26 are likewise, as in the preceding form, oriented so as to lie in planes 125 and 126 which when extended will intersect in a line 127, and said intersecting line is oblique to the central ray extending through the lens-system 21 and 22 at the objective end of this optical system. Furthermore, in this form as in the preceding form, the viewer is arranged so that the rays from the ground object passing therethrough will circumvent an obstacle situated in front of the observer and be visible in a substantially vertical plane directly in front of him as an image which is real, erect and unreversed. It is to be understood that the vertical relation of the viewing member and of the image thereon obtains only when the airplane is in normal level flight, at which time the fore and aft axis of the airplane is substantially horizontal. At all times the viewing member is substantially perpendicular to the fore and aft axis of the airplane, as indicated in the schematic plan view appearing in Fig. 4.

I claim:

In an airplane having an instrument panel positioned directly in front of the pilot and having a light obstructing obstacle in front of the pilot's seat preventing a direct view of the ground below the airplane, an optical apparatus for exhibiting to the pilot on said instrument panel a ground view below the airplane during normal flight, said apparatus comprising a reflecting system and a lens system which together form an optical system containing in optical seriatim, a negative lens, a first reflecting surface, a positive lens, a second reflecting surface, and a viewing screen in the focal plane of said combined lenses and located on said instrument panel in a vertical position perpendicular to the fore and aft axis of the airplane for direct forward view of the screen by the pilot during said normal flight, said negative lens being positioned alongside said obstacle with its axis directed downwardly with respect to the airplane during said normal flight and serving to increase the angle of view and also being positioned to refract rays of light from an object on the ground to said first reflecting surface in unreversed and erect form, said first reflecting surface being positioned obliquely with respect to the axis of said negative lens and alongside said obstacle to reflect said rays in inverted and unreversed form to the positive lens, said positive lens transmitting said rays in reversed and erect form to said second reflecting surface, and said second reflecting surface being positioned substantially directly in front of said viewing screen and obliquely with respect to the axis of said positive lens for directing the light substantially in a perpendicular direction onto said viewing screen to reflect said rays in erect and unreversed form in a substantially vertical plane on said viewing screen, said reflecting surfaces being positioned in planes oblique to each other and to the central light ray passing through said lens system, whereby the rays from the ground object are reflected and diverted at angles around said light obstructing obstacle to form a real, erect and unreversed image on said vertically positioned viewing screen.

ALDEN G. HANDY.

REFERENCES CITED

The following references are of record in the file of this patent:

UNITED STATES PATENTS

| Number | Name | Date |
|---|---|---|
| 835,625 | Konig | Nov. 13, 1906 |
| 1,920,473 | Maury et al. | Aug. 1, 1933 |
| 1,708,746 | VonHofe | Apr. 9, 1929 |
| 2,364,585 | Meyer | Dec. 5, 1944 |
| 2,288,619 | Gardner | July 7, 1942 |
| 2,086,372 | Van Albada | July 6, 1937 |
| 2,374,027 | McMaster | Apr. 17, 1945 |
| 1,871,877 | Buckman | Aug. 16, 1932 |

FOREIGN PATENTS

| Number | Country | Date |
|---|---|---|
| 7,862 | Great Britain | Apr. 5, 1905 |
| 407,159 | Great Britain | Mar. 15, 1934 |
| 647,579 | France | July 31, 1928 |
| 482,468 | France | Dec. 30, 1916 |